United States Patent [19]

Inoue et al.

[11] Patent Number: 4,653,893
[45] Date of Patent: Mar. 31, 1987

[54] CAMERA EXPOSURE CALCULATING DEVICE

[75] Inventors: Manabu Inoue, Kobe; Akihiko Fujino, Sakai; Masaaki Nakai, Kawachinagano, all of Japan

[73] Assignee: Minolta Camera Co., Ltd., Osaka, Japan

[21] Appl. No.: 802,725

[22] Filed: Nov. 29, 1985

[30] Foreign Application Priority Data

Nov. 30, 1984 [JP] Japan .............................. 59-182880[U]

[51] Int. Cl.⁴ ........................ G03B 7/097; G03B 7/16; G03B 7/20
[52] U.S. Cl. ...................................... 354/443; 354/418
[58] Field of Search ........................ 354/418, 441, 443

[56] References Cited

U.S. PATENT DOCUMENTS 4,312,579 1/1982 Araki .................................... 354/443

Primary Examiner—Michael L. Gellner
Attorney, Agent, or Firm—Watson Cole Grindle & Watson

[57] ABSTRACT

An exposure calculating device, for use in a camera having a programmed exposure control mode which automatically calculates a shutter speed and a diaphragm aperture value in a programmed manner, is further capable of modifying the combination of calculated shutter speed and aperture value in accordance with the manual operation. The amount of modification value is automatically reset in response to the detection of the operational condition of the camera, such as a detachment of an exchangeable lens, the charging completion of an electronic flash device, the camera exposure control by a camera accessory, and the change of the exposure control mode.

9 Claims, 8 Drawing Figures

CAMERA EXPOSURE CALCULATING DEVICE

BACKGROUND OF THE INVENTION

1. Field of the Invention

The present invention relates to a camera exposure calculating apparatus which calculates a combination of a shutter speed and a diaphragm aperture value in conformance with a light measurement and a predetermined program and which modifies the combination in such a way as to cause the increase of one of the shutter speed and aperture values by an amount determined by a manual operation and decrease the other by the same amount.

2. Description of the Prior Art

A known camera exposure calculating device of the above mentioned type such as disclosed in a Japanese laid-open patent application with the laid-open No. 54-138431 is provided with a setting switch manually operable for setting a modification value, a modification calculating circuit for modifying the combination of the shutter speed and aperture value by an amount according to the modification value, and a reset switch operable for resetting the modification value to zero. In response to manual operation of the reset switch, the shutter speed and the aperture values are restored to of standard programmed value or the values set in advance of the modification operation.

In the configuration disclosed in the laid-open application, once a shutter speed and an aperture value are modified from the values determined by a standard programmed diagram, the modification values remain in a memory in the camera till the reset switch is operated or the setting switch for modifying the shutter speed and diaphragm aperture in the opposite direction is operated to make zero the memorized value.

If the camera is arranged to enable photography in an exposure mode other than the above mentioned programmed exposure mode, the following problem will occur when a photograph of a picture is taken with the above mentioned modified combination and a next picture subsequently in a different exposure mode. If the user intends to take another picture, subsequently to the photograph in the different exposure, with a shutter speed and aperture value according to the standard program diagram, the previous modification value will still remain in memory. In this case, the reset switch or the setting switch for the reversed direction modification must be operated. Accordingly the reset operation is complicated. Additionally, if the user takes a picture without resetting the modification value, a photograph contrary to the intention of the photographer will result. Furthermore, providing a reset switch in addition to the setting switch not only increases costs of the camera, but is further undesirable in increasing the camera size and weight.

SUMMARY OF THE INVENTION

It is an object of the present invention to provide a camera exposure control device which controls camera exposure in a programmed mode, and in which the exposure control program can be shifted or modified from a given standard and can be restored to the standard automatically.

Another object of the present invention is to provide such a camera exposure control device which does require restoration of the program.

Still another object of the present invention is to provide an exposure calculating device for such a camera exposure control device.

A further object of the present invention is to provide such an exposure calculating device which automatically detects the necessity of restoring of the program.

According to the present invention, when it is judged under the condition of the shutter speed and the aperture value having been modified that it is appropriate to cancel the modification for a change of the camera condition, cancellation of the modification is made automatically thereby and making the camera operation easy and to eliminate undesirable mistaken photographs. Additionally it is not necessary to arrange a preset switch in the camera, resulting in compact size and light weight of the camera.

These and other objects, features and advantages of the invention will become more apparent upon a reading of the following detailed specification and drawings.

DETAILED DESCRIPTION OF THE INVENTION

Figure 1:
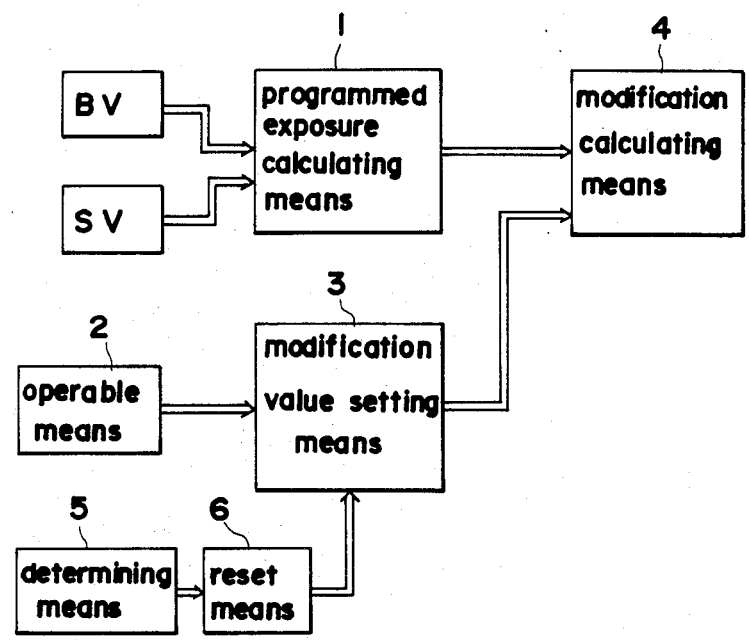
FIG. 1 is a block diagram showing the general circuit configuration of a camera according to the present invention.

FIG. 1 is a block diagram showing a general circuit configuration of the present invention. In the Figure, a programmed exposure calculating means 1 receives brightness data BV of an object to be photographed and film sensitivity data SV, and automatically calculates a proper combination of a shutter speed and a diaphragm aperture value on the basis of the received data, said combination being determined in compliance with a programmed series. A manually operable means 2 is manually operated to modify or shift the shutter speed and aperture value given by the programmed exposure value calculating means 1. A modification value setting means 3 determines the amount of modification or shift from the calculated shutter speed and the aperture value in response to the manual operation of the operable means 2. A modification calculating means 4 modifies the calculated shutter speed and aperture value in accordance with the modification amount data output from the modification value setting means 3 in such a manner that one of the shutter speed and the aperture value increases by the given amount of the modification and the other decreases by the same amount thereby modifying the programmed series of the shutter speed and diaphragm aperture combinations. A determining means 5 determines whether it is appropriate to cancel the modified programmed photography condition and outputs a cancelling signal when the modified programmed exposure control is unnecessary. The conditions to cancel the modified programmed photography condition are such as follows; where the camera exposure control mode is switched to a mode other than the programmed exposure mode, the exchangeable lens has been detached from the camera body, the main capacitor of an electric flash device has been charged above a given level, or the exposure of the camera is controlled according to the data fed from another camera accessory. A reset means 6 resets the modification value in the setting means 3 upon receipt of the cancelling signal from the determining means 5.

When the programmed exposure mode is set in the camera, the programmed exposure calculating means 1 in FIG. 1 automatically calculates a combination of a shutter speed and a diaphragm aperture value. When the user operates the operable means 2 to modify the calculated shutter speed and aperture value, the modification value setting means 3 receives a signal from the operable means 2 whereupon the amount of the modification from the calculated shutter speed and aperture value is determined. The shutter speed and the aperture value are modified by the modification calculating means 4 on the basis of this determined modification amount. When the photographing condition of the camera is changed after the shutter speed and the aperture value are modified, the determining means 5 determines whether it is appropriate to cancel the modification amount. If the cancellation is judged appropriate the cancellation signal is output from the determining means 5 to the reset means 6. The reset means 6, upon receipt of this signal, resets the modification amount setting means 3 to change the modification amount to zero, after which the modification calculating means 4 outputs the data output from the programmed calculating means 1 without modification.

Figure 2:
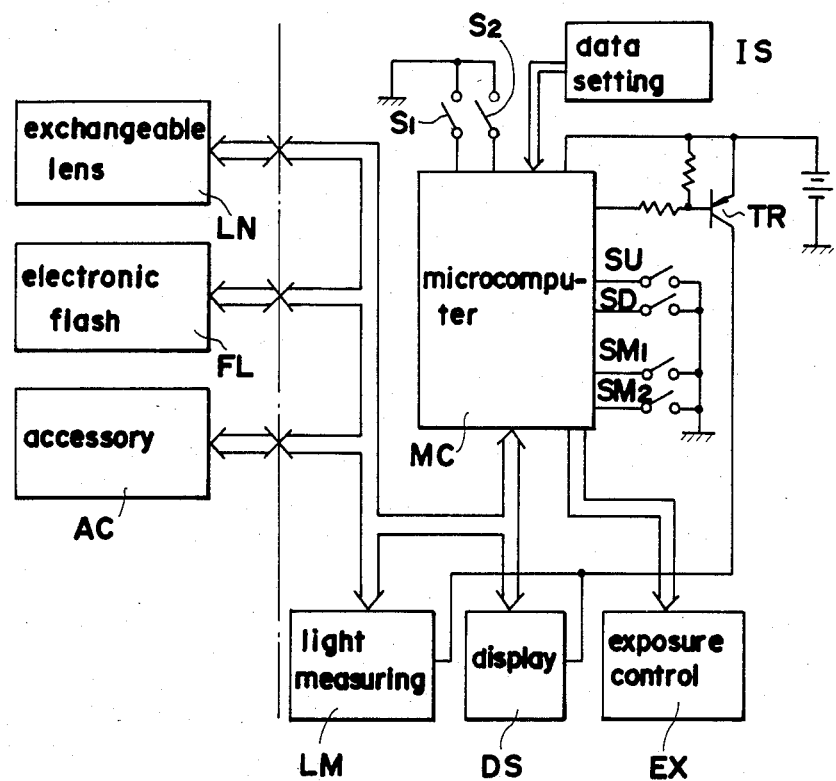
FIG. 2 is a block diagram showing a first embodiment of the present invention.

FIG. 2 shows the configuration of a first embodiment of the invention. A microcomputer MC controls the entire operation of the camera. A switch $S_1$ is closed to initiate an exposure preparation operation. When the switch $S_1$ is switched to an ON condition, an interruption signal is fed to an input port IP1 of the microcomputer MC. The microcomputer MC starts a prescribed operation in response to this interruption signal. A switch $S_2$ is a release switch which commences the exposure control operation. Program shift switches SU and SD are made ON to set the modification value which in turn is used in the shifting of the calculated shutter speed and aperture value for the programmed exposure control (the shifting being hereinafter referred to as "program shift"). The switch SU is used for modifying the shutter speed to a higher value and the aperture towards the full aperture value the switch SD is used for modifying the shutter speed to a lower speed side and the aperture towards the minimum aperture size value. The modification value, that is, the amount of program shift, is set in accordance with the number of times said program shift switches are turned ON. Switches SM1 and SM2 are for setting of the exposure control mode of the camera. The combination of the ON/OFF positions of these switches SM1 and SM2 provides four exposure control modes, i.e., a manual exposure control mode (hereinafter referred to as "M mode") in which the aperture value and shutter speed are determined manually, an aperture priority exposure control mode (hereinafter referred to as "A mode") in which the shutter speed is determined automatically based on the manually set aperture value, a shutter priority exposure control mode (hereinafter referred to as "S mode") in which the aperture value is determined automatically based on the manually set shutter speed, and a programmed exposure mode (hereinafter referred to as "P mode") in which the aperture value and the shutter speed are both determined automatically in accordance with a predetermined program. The program shift switches SU and SD, and the exposure mode setting switches SM1 and SM2 are connected to the input terminals IP3 through IP6 of the microcomputer MC, respectively, and the function of setting the modification value, exposure mode and so on is effected according to the program of the microcomputer MC. An exposure information setting section IS outputs set exposure data such as a film sensitivity, a predetermined shutter speed, and a predetermined aperture value. A light measuring section LM measures the brightness of an object to be photographed, converts this measurement output from analog to digital form, and outputs the digitalized signal. An exposure control section EX receives signals from the microcomputer MC and controls the diaphragm and the shutter of the camera based thereon. A display section DS receives from the microcomputer MC signals of photographic data, decodes the signal, and displays the data. Camera accessories LN, FL, and AC attached to the camera body may respectively be an exchangeable lens, an electronic flash apparatus, and another type of accessory. The exchangeable lens LN outputs, to the busline BL of the camera, lens data such as full open aperture value and maximum aperture value (corresponding to the minimum size of the aperture), and verification data for verifying whether the lens is properly attached to the camera body. The electronic flash device FL outputs to the busline BL various data including a charge completion signal indicating the completion of the electrical charging in the electronic flash device. The other type of accessory AC may, for example, be a data imprinting device or a data back device which can perform data imprinting onto a film or camera exposure control. Another accessory may be a receiver mounted on the camera and receiving signals for remote control of the camera. The data output from the data back or receiver of the accessory AC to the busline BL may include data of shutter speed and aperture value to be controlled in the camera, and the camera exposure is carried out according to these data. The data may further include verification data for verifying that the accessory AC controls the camera exposure. Transistor TR supplies electric power to the light measuring section LM and the display portion DS, and the base of the transistor TR is connected through a resistor to an output terminal OP1 of the microcomputer MC. The busline BL is a common busline inter-connecting the microcomputer MC, the light measuring section LM, and the display section DS, and is also connected via connectors (not shown) of the camera body to each of the accessories LN, FL, and AC.

Figure 3:
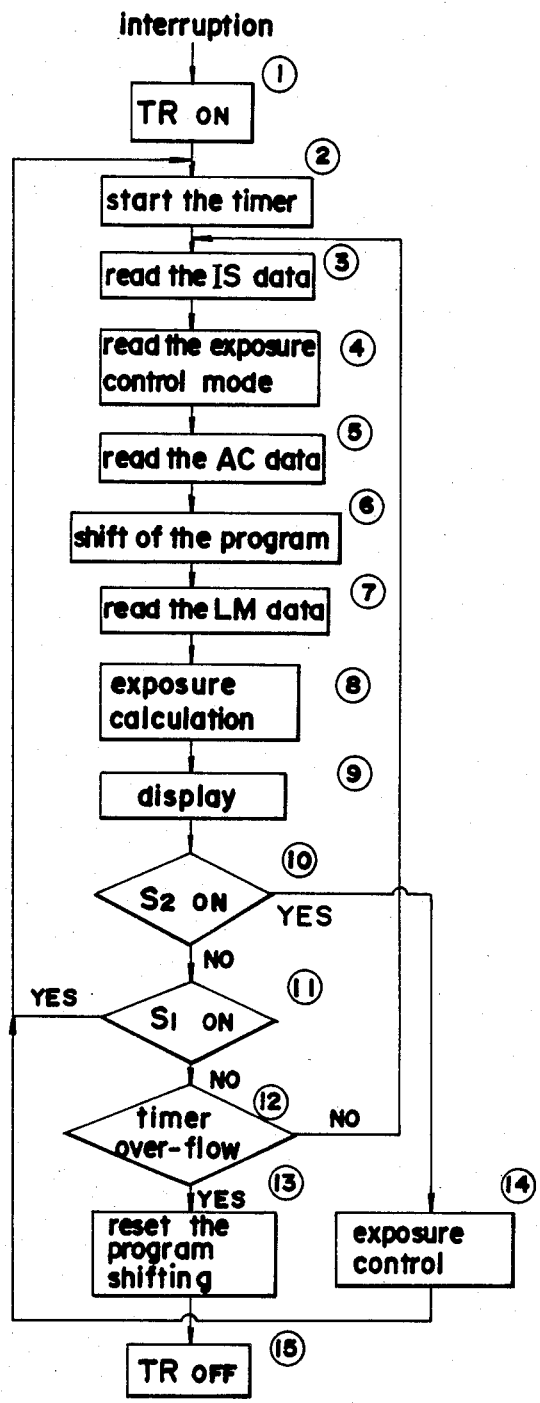
FIG. 3 is a flow chart representing the control operation of a microcomputer (MC) shown in FIG. 2.

The operation of the above mentioned circuit will be explained below with reference to the flowchart in FIG. 3 which shows an outline of the program of the microcomputer MC.

To save electric current, the microcomputer MC sets the input terminal IP0 to a "HIGH" level causing the transistor TR to be non-conductive when camera control is not performed, and concurrently suspends its own operation at step (15). When the switch S1 is switched to ON, an interruption signal is supplied to the input terminal IP1, causing the microcomputer MC to start its operation. The microcomputer MC sets the output port OP1 to a "LOW" level. Accordingly the transistor TR conducts at step (1), and the light measuring section LM and the display section DS are supplied with electric power, whereupon light measurement is commenced. At the next step (2), a timer incorporated in the microcomputer MC is set to count 10 seconds, after which the timer is activated. The timer is used to maintain power supply to the light measuring section LM and the display section DS for 10 seconds even after the light measuring switch S1 is switched to OFF. Next, exposure data signals from the data setting section IS are read at step (3). With the read data, a check is made whether there are any changes in film sensitivity or the like, and the film sensitivity data and the like in the memory of the microcomputer MC are renewed if there are such changes. Then, the voltage level at the exposure mode selecting switches SM1 and SM2 representative of the set exposure mode are read and memorized at step (4). Next, data from the exchangeable lens LN, the electronic flash device FL, and the other accessory AC is read in sequence into the microcomputer MC through the busline BL at step (5). Next, a check is made whether or not a shift of the program is to be performed at step (6).

Figure 4:
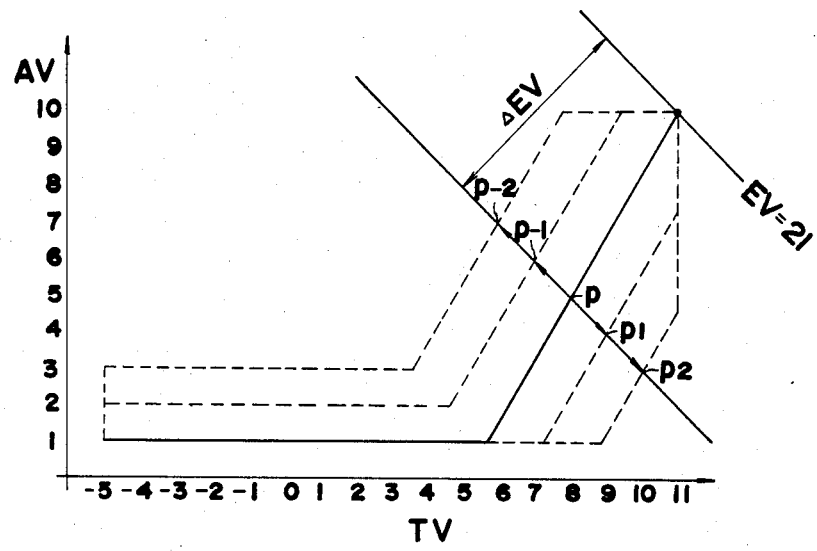
FIG. 4 is a diagram showing an exposure control program according to a first embodiment of program shifting.

With reference to FIG. 4, an explanation will be given of the shifting of the program diagram. In FIG. 4, the abscissa represents shutter speed value TV expressed by the time value unit according to the APEX system and the ordinate represents aperture value AV also expressed by the APEX unit for the diaphragm aperture. The program line passing through the point P and shown by the solid line shows the standard program. This program line passes through the point for the shutter speed SS of 1/2000 sec. and the aperture value in FNO of 32, or, in APEX values TV and AV of 11 and 10, with a gradient TV: AV=3:5. Further, in a range where AV≦1 (in FNO≦1.4), only the shutter speed value TV varies with AV remaining 1. When the exposure value EV is 13, TV and AV values at the P point are selected 8 and 5 respectively in the standard program. When the user is dissatisfied with the shutter speed or the aperture value given by the standard program diagram, he or she may switch on the program shift modifying switch SU a single time, then the combination of the shutter speed and diaphragm aperture values will be shifted, from point P (8, 5) to P1 (9, 4). When the switch SU is switched ON a second time, the combination is shifted from point P1 (9, 4) to P2 (10, 3). Alternatively, when the program shift modifying switch SD is switched ON, a reverse program shift is effected wherein the combination of the shutter speed and aperture values shifts from the point P (8, 5) to P-1 (7, 6), then to P-2 (6, 7) and so forth. In the explanation given above, aperture value and shutter speed value were respectively modified by one step of exposure value, i.e., 1EV in response to the switching ON of the program shift modifying switches SU or SD. However, in the example shown in FIG. 7 which will be explained later on, the aperture value and the shutter speed are respectively modified by ½ EV in response to the switching to ON of the switches SU or SD.

Next, with reference to FIG. 5, a detailed explanation will be given below of the program shift operation.

Figure 5:
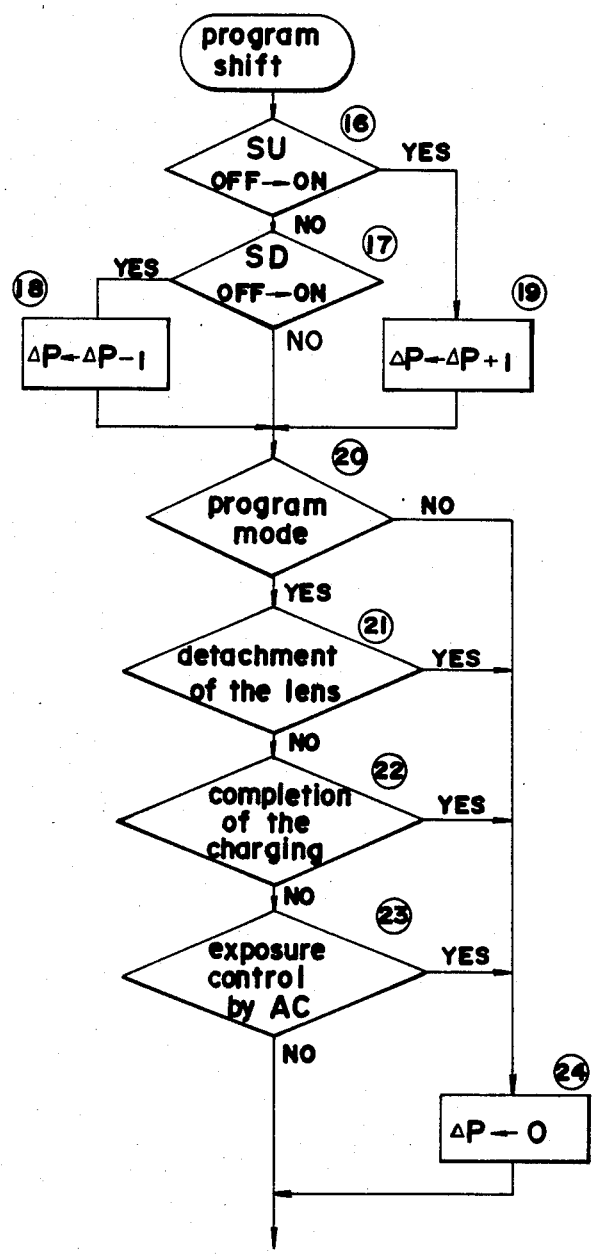
FIG. 5 shows a detailed flow chart of a program shift modification FIG. 2.

In FIG. 5, first, the ON/OFF states of the program shift switches SU and SD are checked at steps (16) and (17), and when switches SU and SD are switched ON the modification value ΔP of the program are changed to (ΔP+1) and (ΔP−1) at steps (18) and (19). In order to verify that the switches SU and SD have been switched from OFF to ON, it is detected whether flags have been set or reset when the switches are switched ON. The flags are arranged to set when the switches are switched OFF, and reset after the set of the flag are detected. Next, a judgment is made at steps (20) through (23) as to whether or not the conditions are appropriate for resetting the shifted program. In the four cases as stated below it is determined that the user obviously no longer intends to photograph with the shifted program and the above stated program shift value ΔP is reset at step (24).
(1) when the exposure control mode is changed from the P mode to another mode (that is the A, S or M modes) at step (20).
(2) when the lens is exchanged (when the lens has been detached from the camera) at step (21).
(3) when the charging the main capacitor in the electronic flash device is completed at step (22).
(4) when the camera exposure is controlled by the accessory AC at step (23).

The determination is made with the data received at the above steps (4) and (5). In addition to the four cases stated above, the reset of the shifting of the program is also performed when the electric power supply is stopped at step (13).

Figure 6:
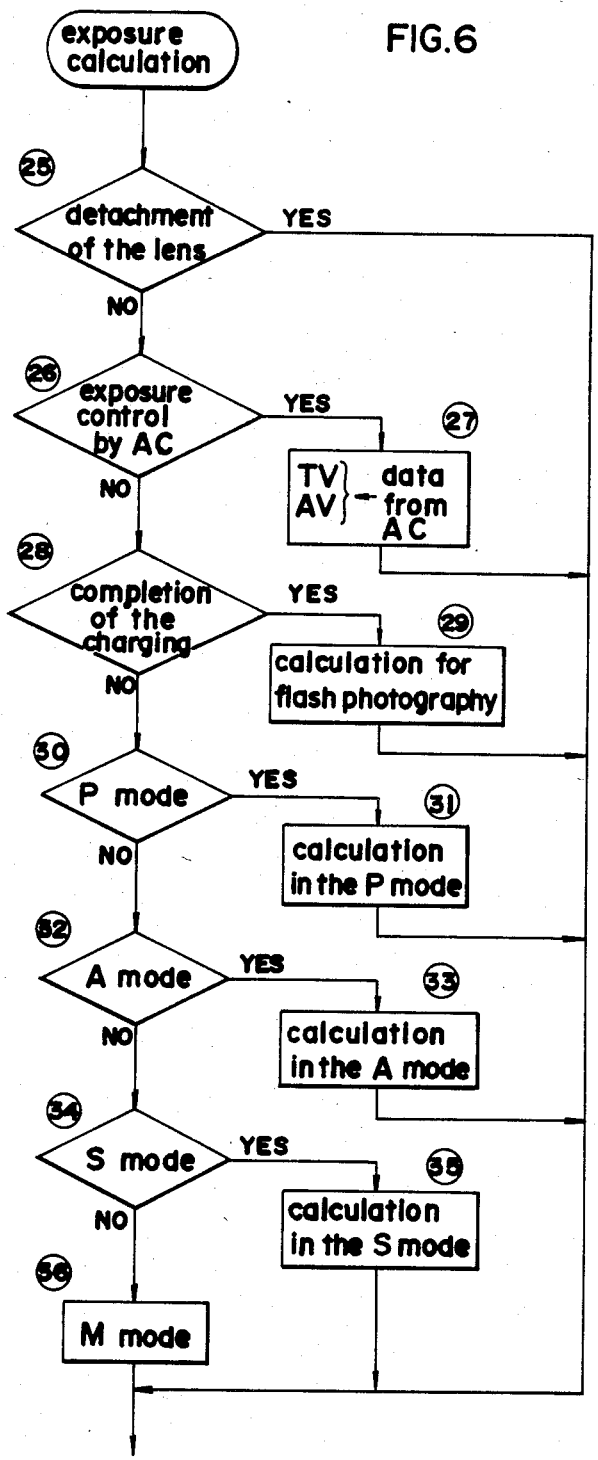
FIG. 6 shows a detailed flowchart of an exposure calculation in FIG. 2.

After the modification of the value ΔP for the shifting of the program, the object brightness data is read at step (7) from the light measuring section LM, and an exposure calculation is performed at step (8). The process of this exposure calculation at step (8) is briefly shown in FIG. 6. In FIG. 6, when an exchangeable lens LN has not been attached, the aperture of the camera mount is regarded as a diaphragm aperture with a given aperture value and the shutter speed TV is calculated from the film sensitivity value and the light measurement value measured through the mount aperture. When an exchangeable lens LN is attached to the camera and, the camera is to be controlled by the accessory AC, the data of shutter speed and aperture value read from the accessory A at step (5) is output at steps (26) and (27). When the charging of the main capacitor in the electronic flash device FL has been completed, with an exchangeable lens LN having been attached and the camera not to be controlled by the accessory AC, exposure calculation for flash photography is performed, and data of shutter speed and aperture value for the flash photography is output at steps (28) and (29). In the photography modes other than that stated above, e.g. the P mode, A mode and S mode, exposure calculations for the respective modes are performed and signals for the shutter speeds and the aperture values are output at steps (30) through (35). When the exposure is controlled in the M mode, data for the set shutter speed and set aperture value are output at step (36). Thus, the exposure calculations are finished. A detailed explanation will be given below with reference to FIG. 7 about the calculation at step (31) in the P mode.

Figure 7:
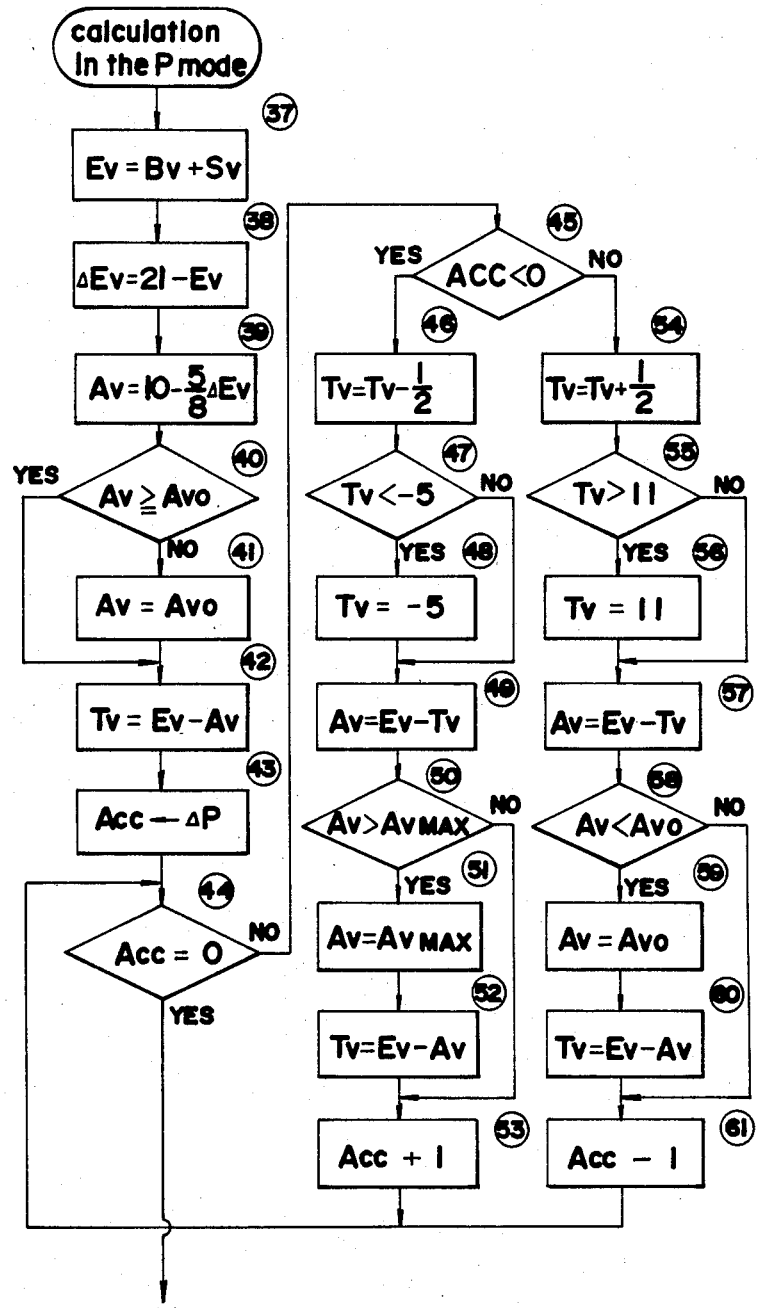
FIG. 7 shows a detailed flow chart of the exposure calculation in program mode.

FIG. 7 is a flowchart of the operation to determine exposure parameters such that they comply with the program given by the diagram shown in FIG. 4. First, from the object brightness value BV−AV0 measured through the fully open aperture, the fully open aperture value AV0, and the film sensitivity value SV is calculated from the exposure value EV at step (37) in accordance with the formula $EV = (BV - AV0 + AV0) + SV$. Then the difference $\Delta EV$ of the calculated exposure value EV from the maximum available exposure value (in the present embodiment the maximum $EV = 21$ ($TV = 11$, $AV = 10$)) is calculated at step (38). The aperture value AV for the calculated exposure EV is calculated at step (39) from the difference $\Delta EV$, the ratio of distribution of the exposure value to the aperture value AV and the shutter speed value TV (gradient of the program line) which equals $\frac{3}{5}$, and the maximum aperture value AV which equals 10. When the aperture value AV calculated as explained above is smaller than the full open aperture value AV0 of the exchangeable lens being used, the above calculated aperture value is replaced by the full open aperture value AV0 at steps (40) and (41), and when greater than or equal thereto, the calculated aperture value is used as it is at step (40). Then the shutter speed TV is calculated at step (42) from the exposure value EV and the aperture value AV. Thus, the combination of the shutter speed and diaphragm aperture is determined to comply with the standard program diagram.

The following explanation concerns the shift of the program determined in the manner described above. First, at step (43), the program shift value $\Delta P$ is put into an accumulator which is a register in the microcomputer MC. It is determined at step (44) whether or not the program shift value $\Delta P$ is 0. If the program shift value $\Delta P$ is 0, the calculating operation is finished since there is no shift. When the value $\Delta P$ is not 0, first the direction of the shift is determined at step (45). When the shift value AP is positive, the shutter speed value TV is increased by $\frac{1}{2}$ EV at step (54), and when this shifted shutter speed value TV exceeds the available highest speed value ($TV = 11$), the shifted shutter speed value TV is replaced by the highest speed value ($TV = 11$) at steps (55) and (56). When the shifted shutter speed value TV does not exceed the highest speed value ($TV = 11$), the shifted shutter speed value ($TV + \frac{1}{2}$) is used. Then the aperture value AV is calculated at step (57) from the exposure value EV and the finally determined shutter speed value TV. When this aperture value AV is smaller than the fully open aperture value AV0, the aperture value AV is replaced by fully open aperture value AV0 at steps (58) and (59), and the shutter speed TV to provide a proper exposure with the fully open aperture is re-calculated at step (60). When the aperture value AV shifted at step (57) is not smaller than the fully open aperture value AV0, the shifted aperture value AV and shutter speed value TV are adopted at step (58). Then "1" is subtracted from the value stored in the accumulator ACC and the operation returns to step (44).

When the program shift value $\Delta P$ is negative, this means that the direction of shift is reversed, $\frac{1}{2}$ EV is subtracted from the shutter speed value TV at step (46). When this shifted shutter speed value TV is smaller than the minimum shutter speed value ($TV = -5$), the shifted shutter speed value TV is replaced by the minimum shutter speed value ($TV = -5$) at steps (47) and (48). When not smaller, the shifted shutter speed value TV is used as it is at step (47). After that an aperture value AV is calculated from the exposure value EV and the adopted or remaining shutter speed value TV at step (49). When this aperture value AV exceeds the maximum aperture value AVmax, the calculated aperture value AV is replaced by the maximum aperture value AVmax at steps (50) and (51), and the shutter speed value to provide a proper exposure with the fully stopped down aperture is re-calculated at step (52). When the aperture value AV does not exceed the maximum aperture value AVmax, the calculated aperture value AV and shutter speed value TV are adopted at step (50). Then "1" is added to the value stored in the accumulator ACC at step (53), and the operation returns to step (44). The operations at steps (45) through (61) are repeated the number of times of program shifts until the content of the accumulator ACC becomes "0", whereupon the exposure calculation operation is finished.

Returning to FIG. 3, when the exposure calculation operation is finished, the result of the calculation is output to the display section DS at step (9), and the aperture value FNO and the shutter speed SS are displayed. Then, if the release switch S2 has been switched ON at step (10), an exposure is made in accordance with the calculated aperture value FNO and shutter speed SS at step (14). After completion of exposure, the operation returns to step (2). When the release switch S2 is OFF at steps (10) and the switch S1 has been switched ON at step (11), the operation returns to step (2). On the other hand, when the switch S1 is OFF, time counting is commenced at step (2), then a judgment is made at step (12) whether the timer has counted 10 seconds. If the timer has not counted 10 seconds, operation is repeated from step (3). At this time, since the operation does not pass through step (2), the timer continues the counting without interruption. Then, when 10 seconds elapses, the program shift value $\Delta P$ is reset to zero at step (13), after which the transistor TR is made non-conductive, stopping the supply of electric power to the light measuring portion LM and the display portion DS, and concurrently stops its own operation at step (15). In this manner, the timer effects a 10 second maintenance of the electric power supply and concurrently performs the reset of the program shift in response to the termination of the electricity supply.

Figure 8:
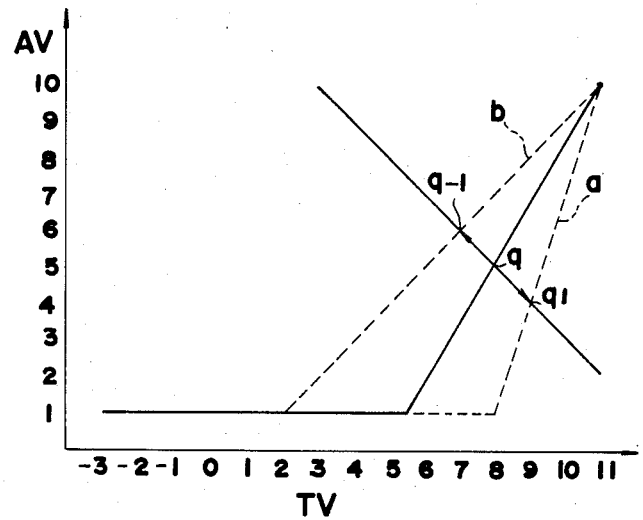
FIG. 8 is a diagram showing an exposure control program according to a second embodiment of program shifting.

FIG. 8 is a diagram of a program according to a second embodiment of a program shift. In the program shift of the first embodiment described above, the shutter speed value TV and the aperture value AV calculated to comply with the standard program are shifted by a given amount when the shift switches SU or SD is switched ON. In the embodiment shown in FIG. 8, however, the gradient of the standard program line is varied when the program shift switches SU or SD is switched ON. The manner of shifting will be explained in more detail. The solid line in the drawing has the same gradient $TV:AV = 3:5$ as the solid line shown in the program diagram in FIG. 4. The gradient of the program line a is $TV:AV = 1:3$ and the gradient of the program line b is $TV:AV = 1:1$. When the program shift switch SU is switched ON the program is changed from the one given by the solid line to that given by the program line a and the combination of the shutter speed and diaphragm aperture is changed from the point q to q1. When the switch SD is switched ON the program defined by the solid line is changed to that given by the program line b and the combination of the shutter speed and diaphragm aperture is shifted from the point q to a point q-1. The number and interval of steps in and the manner of modifying the gradient, may be changed or increased, and further, the program may be changed in various ways.

Embodiments of the invention have been described above, however, the invention should not be limited to those specifically explained herein. For example, the available exposure control modes need not necessarily comprise four types (P, A, S and M modes) and, may comprise the P mode only at minimum, in which case the mode determining operations may be eliminated from the relevant flowchart. Further, the operation relating to flash photography may be performed in accordance with a signal representing that an electronic flash device FL is attached to the camera.

While there has been described a preferred form of the invention, obviously modifications and variations are possible in light of the above teachings. It is therefore to be understood that within the scope of the appended claims, the invention may be practiced otherwise than as specifically described.

What is claimed is:

1. An exposure calculating device for use in a camera which device automatically calculates a shutter speed and a diaphragm aperture value in accordance with a predetermined exposure program and further calculates a light measuring value, said device comprising:

manually operable means for generating a signal in response to the manual operation thereof;

setting means for setting a modification value in accordance with the signals from said operable means;

calculating means for modifying the calculated shutter speed and aperture value by the modification value;

reset means for reseting the modification value to zero; and means for automatically determining the appropriateness of the resetting of said reset means in accordance with the operational condition of said camera and generating a reset signal when the appropriateness of the resetting is determined.

2. The exposure calculating device as in claim 1, wherein said camera is used with an exchangeable lens detachably mountable thereto, and said determining means includes a detecting means for detecting the attachment of said exchangeable lens on said camera and generates the reset signal when the exchangeable lens has been detached.

3. the exposure calculating device as in claim 1, wherein said camera is used with an electronic flash device which outputs to said camera a preparatory signal when said flash device is in condition to emit the flash light, and said determining means includes a detecting means for detecting the preparatory signal from said flash device and generates the reset signal when the preparatory signal is input from said flash device.

4. The exposure calculating device as in claim 3, wherein the preparatory signal includes a charging completion signal representing the completion of electronic charge for the light emission.

5. The exposure calculating device as in claim 1, wherein said camera is used with a camera accessory which is selectively mounted to said camera and capable of controlling the camera exposure, and said determining means includes a detecting means for detecting whether the camera exposure is controlled by the data from said camera accessory and generates the reset signal when the camera exposure is controlled by said camera accessory.

6. The exposure calculating device as in claim 1 further comprising means for calculating a shutter speed and a diaphragm aperture value in accordance with a different exposure control mode than said predetermined exposure program and a selecting means for selecting the exposure control modes including a mode by the predetermined exposure program, and said determining means includes a detecting means for detecting whether the different exposure control mode is selected by said selecting means and generates the reset signal when the different exposure control mode is selected.

7. The exposure calculating device as in claim 1, wherein said camera further includes a light measuring means, a switch operable to close for initiating the camera operation, and a maintaining means for starting to supply the electric power to said light measuring means in response to the closure of said switch and suspending the power supply for a given period after said switch is switched open, and said determining means includes a detecting means for detecting whether the power supply is suspended and generates the reset signal when the power supply is suspended.

8. The exposure calculating device as in claim 1, wherein said modification calculating means includes an increasing means for increasing at least one of the calculated shutter speed and aperture value by an amount according to the modification value and a decreasing means for decreasing the other exactly by the same amount.

9. The exposure calculating device as in claim 1, wherein said modification calculating means includes a varying means for varying the gradient of the predetermined program line in accordance with the modification value.

* * * * *